United States Patent
Kirsch (10) Patent No.: US 8,532,574 B2
(45) Date of Patent: Sep. 10, 2013

(54) DESTINATION INFORMATION SHARING FOR THE AUTOMOBILE ENVIRONMENT

(75) Inventor: David M. Kirsch, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 322 days.

(21) Appl. No.: 13/083,440

(22) Filed: Apr. 8, 2011

(65) Prior Publication Data
US 2011/0184789 A1  Jul. 28, 2011

Related U.S. Application Data

(63) Continuation-in-part of application No. 12/536,205, filed on Aug. 5, 2009.

(51) Int. Cl.
 *H04B 7/00* (2006.01)
 *H04M 1/00* (2006.01)
 *G08G 1/123* (2006.01)

(52) U.S. Cl.
 USPC ...... 455/41.2; 455/66.1; 455/575.9; 340/989; 340/995.16

(58) Field of Classification Search
 USPC ................. 455/41.2, 66.1, 556.1, 575.9, 345; 340/989, 995.16
 See application file for complete search history.

(56) References Cited

U.S. PATENT DOCUMENTS

| | | | |
|---|---|---|---|
| 6,124,826 A | 9/2000 | Garthwaite et al. | |
| 6,125,326 A | 9/2000 | Ohmura et al. | |
| 6,462,674 B2 * | 10/2002 | Ohmura et al. | ............... 340/901 |
| 6,526,335 B1 | 2/2003 | Treyz et al. | |
| 6,600,990 B2 | 7/2003 | Takenaga | |
| 6,633,809 B1 | 10/2003 | Aizono et al. | |
| 6,748,321 B2 | 6/2004 | Watanabe et al. | |
| 6,768,450 B1 | 7/2004 | Walters et al. | |
| 6,996,468 B2 | 2/2006 | Kohno et al. | |
| 7,034,747 B1 | 4/2006 | Walters et al. | |
| 8,306,548 B2 * | 11/2012 | Yuhara et al. | ............... 455/452.2 |
| 8,406,253 B2 * | 3/2013 | Kato et al. | .................... 370/466 |

(Continued)

FOREIGN PATENT DOCUMENTS

| | | |
|---|---|---|
| JP | 2002-267461 | 9/2002 |
| JP | 2007-333711 | 12/2007 |
| JP | 2008-275544 | 11/2008 |
| WO | WO 02/42718 | 5/2002 |

OTHER PUBLICATIONS

Anonymous, "Integrated Information System," Research Disclosure Database No. 438014, Oct. 2000, two pages, The Industry Standard Disclosure Publication Service.

(Continued)

*Primary Examiner* — Andrew Wendell
(74) *Attorney, Agent, or Firm* — Fenwick & West LLP; Mark Duell (57) ABSTRACT

An in-vehicle system may detect an occurrence of a triggering event, detect a short-range communication connection between the in-vehicle system and a mobile communication device, send a prompt, including a request for information, to the mobile communication device, and receive a response, including the requested information, from the mobile communication device via the short-range communication module. In some embodiments, a business review, an advertisement, or a redeemable electronic coupon may be sent to the mobile communication device after the requested information is provided. Furthermore, destination information may be shared between the in-vehicle system and the mobile communication device in response to the triggering event.

28 Claims, 8 Drawing Sheets

(56) References Cited

U.S. PATENT DOCUMENTS

| | | | |
|---|---|---|---|
| 2002/0142803 A1* | 10/2002 | Yamamoto | 455/557 |
| 2002/0152027 A1 | 10/2002 | Allen | |
| 2003/0164778 A1* | 9/2003 | Muramatsu | 340/988 |
| 2004/0024522 A1* | 2/2004 | Walker et al. | 701/210 |
| 2004/0034468 A1 | 2/2004 | Kobayashi et al. | |
| 2004/0203379 A1 | 10/2004 | Witkowski et al. | |
| 2005/0273251 A1 | 12/2005 | Nix et al. | |
| 2005/0273252 A1 | 12/2005 | Nix et al. | |
| 2008/0002758 A1 | 1/2008 | Schmidt et al. | |
| 2008/0015748 A1 | 1/2008 | Nagy | |
| 2008/0027643 A1 | 1/2008 | Basir et al. | |
| 2008/0039034 A1* | 2/2008 | Fujita et al. | 455/179.1 |
| 2008/0082221 A1 | 4/2008 | Nagy | |
| 2008/0132270 A1 | 6/2008 | Basir | |
| 2008/0167806 A1 | 7/2008 | Wheeler et al. | |
| 2009/0079622 A1 | 3/2009 | Seshadri et al. | |

OTHER PUBLICATIONS

Matsuda, M., "KDDI Jointly Develops Technology to Transfer Destination Information Retrieved on Cell-phone to Car Navigation," Mar. 23, 2009, four pages. [Online] [Retrieved Jan. 12, 2012] Retrieved from the Internet <URL:http://japan.cnet.com/mobile/story/0,3800078151,20390314,00.htm.>.

PHYSORG.COM, "Vehicle Communications System in Your Pocket," Apr. 9, 2008, three pages. [Online] [Retrieved Jan. 11, 2012] Retrieved from the Internet <URL:http://www.physorg.com/print126967327.html.>.

* cited by examiner

DESTINATION INFORMATION SHARING FOR THE AUTOMOBILE ENVIRONMENT

RELATED APPLICATIONS

This application is a continuation-in-part of U.S. patent application Ser. No. 12/536,205 entitled "Mobile Communication Device Linked to In-Vehicle System" filed on Aug. 5, 2009, the content of which is incorporated by reference herein in its entirety.

BACKGROUND

1. Field of the Invention

The present teachings relate to methods, in-vehicle systems, and mobile communication devices in which an in-vehicle system receives information from and sends information to a mobile communication device linked to the in-vehicle system via a short-range communication connection.

2. Discussion of the Related Art

Currently, for hands-free communication within an automobile, a handheld wireless mobile phone in a passenger compartment of an automobile may wirelessly link to an in-vehicle system. Typically, the mobile phone and the in-vehicle system connect to one another using a short-range wireless communication technology, such as Bluetooth® (Bluetooth is a registered trademark of Bluetooth Sig, Inc., a Delaware corporation, with an office in Bellevue, Wash.). Generally, the in-vehicle system is limited to providing only basic phone operations to the wirelessly linked mobile phone, such as phone calls, address book searching, and basic text messaging features.

Today, a user's mobile phone is his/her communication center. For example, a user may use a mobile phone for online banking, phone calls, text messaging, viewing and sending e-mails, instant messaging, Internet searching, as well as other uses. However, existing in-vehicle systems are unable to easily access a mobile phone to communicate messages to a user, such as a driver. One possible solution to this problem is to install a phone module in the automobile and have the in-vehicle system use the phone module to communicate with a user's mobile phone via a standard phone call. However, such a solution may be more expensive and may have future compatibility issues if large changes are made to cellular communication infrastructure.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

An in-vehicle system may detect an occurrence of a triggering event. A triggering event can be a single event, a plurality of events or a plurality of events that occur in a particular order. Examples of triggering events may include: vehicle ignition switch on; vehicle ignition switch off; vehicle located at a particular type of location, opening or closing a door, inserting or removing a key from the ignition, as well as other events. In addition, other example events can include any number of events in combination or in a particular order. Upon detection of a triggering event, the in-vehicle system may communicate with a wireless mobile communication device via a short-range communication link. As an example, when a vehicle ignition switch off triggering event is detected, the in-vehicle system may send information to the wireless mobile communication device, where the information may be stored.

A user may modify at least some of the information stored on the wireless mobile communication device when the user is away from the vehicle. Upon returning to the vehicle, the in-vehicle system may detect a vehicle ignition switch on triggering event. The in-vehicle system may notify the wireless mobile communication device of the detected triggering event, which may cause the wireless mobile communication device to send the stored information to the in-vehicle system via a short-range communication connection.

Some embodiments of the wireless mobile communication device may forward at least some information received from the in-vehicle system to a remote processing device for further processing. Some embodiments of the wireless mobile communication device may also include an application that may be downloaded and installed to a wireless mobile communication device. When executed by the wireless mobile communication device, the application may send information stored on the wireless mobile communication device to an in-vehicle system and/or may receive information from the in-vehicle system for storage on the wireless mobile communication device via a short-range communication link.

In one embodiment, destination information is shared between the in-vehicle system and the wireless mobile communication device. The in-vehicle system detects an occurrence of a trigger event (e.g., vehicle ignition shut off) while the in-vehicle system is providing navigation guidance to a desired destination. Responsive to detecting the occurrence of the trigger event, the in-vehicle system determines whether to send the destination data to a mobile communication device. Responsive to determining not to send the destination information to the mobile communication device, the in-vehicle system performs a background information transfer from the in-vehicle system to the mobile communication device. Responsive to determining to send the destination data to the mobile communication device, the in-vehicle system performs an information transfer of the destination data to the mobile communication device.

The mobile communication device receives the destination data corresponding to the desired destination. The mobile communication device displays a prompt requesting a user to select whether or not to continue to the desired destination and receives a response to the prompt from the user. Responsive to the user indicating that the user does not want to continue to the desired destination, the mobile communication device stores the destination data. Responsive to the user indicating that the user wants to continue to the desired destination, the mobile communication device provides navigation instructions to the desired destination using the destination data.

BRIEF DESCRIPTION OF THE DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Overview

An in-vehicle system, within a vehicle, may detect an occurrence of a triggering event. A triggering event can be a single event, a plurality of events or a plurality of events that occur in a particular order. Examples of triggering events may include: vehicle ignition switch on; vehicle ignition switch off; vehicle located at a particular type of location, opening or closing a door, inserting or removing a key from the ignition, as well as other single events, or other events in combination or in a particular order. In some embodiments, the in-vehicle system may include a navigation unit and the triggering event may include: (a) detecting the vehicle being located at a particular type of location such as, for example, a point of interest, including a fueling station, a restaurant, a movie theater, or other type of location; (b) detecting the vehicle being located at a fueling station and a refueling door of the vehicle being sensed to be in an open position; and (c) detecting the vehicle being located near a restaurant, to which the navigation unit provided guidance for the vehicle to reach; as well as other triggering events.

Upon detecting the occurrence of a triggering event, the in-vehicle system may determine whether a connection exists between the in-vehicle system and a wireless mobile communication device such as, for example, a mobile phone or other communication device. If the connection exists, the in-vehicle system may send information to the wireless mobile communication device. The in-vehicle system and the wireless mobile communication device may communicate with each other using short-range communication technology such as, a wireless short-range communication technology, for example, Bluetooth® or other short-range communication technology, for example, Universal Serial Bus (USB). The wireless mobile communication device may receive the information and present the information on a display of the wireless mobile communication device.

In some embodiments, the information sent to the wireless mobile communication device may be in the form of a prompt to provide information to the user of the wireless communication device. In some embodiments, the prompt may be presented in a pop-up style window on the display. In other embodiments, the prompt may also request information from a user of the wireless mobile communication device. A user may provide the requested information via the wireless mobile communication device, which may then send the requested information to the in-vehicle system using the short-range communication technology.

In some embodiments, regardless of whether an in-vehicle system does or does not include a navigation system, the in-vehicle system may detect an occurrence of a triggering event and may perform an action involving one or more short-range communications with a wireless mobile communication device.

For example, the in-vehicle system may detect an occurrence of a first type of triggering event and, as a result, may send a prompt to the wireless mobile communication device via a short-range communication connection. The wireless mobile communication device may display the prompt requesting information and a user may provide the requested information via the wireless mobile communication device. The wireless mobile communication device may then send the requested information to the in-vehicle system.

When the in-vehicle system detects an occurrence of a second type of triggering event, the in-vehicle system may send, via the short-range communication connection, second information to the wireless mobile communication device, which may then receive and store the second information and/or may send the second information to a remote processor, such as, for example, a server. In some embodiments, the second type of triggering event may include turning a vehicle ignition switch off, or other triggering event, and the second information may include vehicle status information, or other information.

When the in-vehicle system detects an occurrence of a third type of triggering event, the in-vehicle system may send to the wireless mobile communication device, via the short-range communication connection, an indication of the occurrence of the third type of triggering event. In response to receiving the indication, the wireless mobile communication device may send stored second information to the in-vehicle system via the short-range communication connection. In some embodiments, the third type of triggering event may include turning a vehicle ignition switch on, or other triggering event.

Examples of how embodiments may be used may include, but not be limited to: (a) detecting a vehicle being located at a fueling station, detecting an existing connection between an in-vehicle system and a wireless mobile communication device, sending a prompt to the wireless mobile communication device requesting information regarding a price of fuel per unit and a number of units purchased, and receiving a response, from the wireless mobile communication device, including the requested information from the user; (b) detecting the vehicle being located near a restaurant, to which the in-vehicle system provided the vehicle with navigation guidance, detecting an existing connection between an in-vehicle system and a wireless mobile communication device, sending a prompt to the wireless mobile communication device requesting the user to provide information regarding a dining experience at the restaurant, and receiving a response, including the information, from the wireless mobile communication device; and (c) detecting the vehicle being located near a movie theater, to which the in-vehicle system provided navigation guidance, detecting an existing connection between an in-vehicle system and a wireless mobile communication device, sending a prompt to the wireless mobile communication device requesting the user to provide information regarding a movie viewing experience at the movie theater, and receiving a response, including the information, from the wireless mobile communication device.

In some embodiments, an application may be downloaded and installed to a wireless mobile communication device. When executed by the wireless mobile communication device, the application may send information stored on the wireless mobile communication device to an in-vehicle system and/or may receive information from the in-vehicle system for storage on the wireless mobile communication device via a short-range communication link. As new types of communications may be developed for communicating between an in-vehicle system and a wireless mobile communication device, an updated application may be downloaded and installed to the wireless mobile communication device. In addition, when a user replaces a wireless mobile communication device with an updated wireless mobile communication device, an updated application may be downloaded and installed to the updated wireless mobile communication device, such that types of messages communicated between the in-vehicle system and a previous wireless mobile communication device, may continue to be communicated between the in-vehicle system and the updated wireless mobile communication device, as well as supporting new types of messages.

Exemplary Operating Environment

Figure 1:
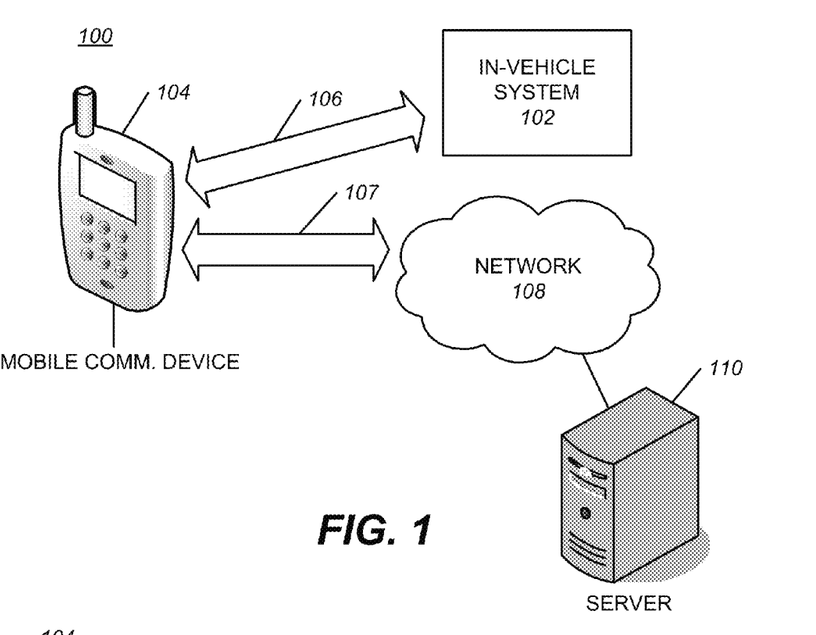
FIG. 1 illustrates an exemplary operating environment of various embodiments.

FIG. 1 illustrates an exemplary operating environment 100 for various embodiments. Operating environment 100 may include an in-vehicle system 102, a wireless mobile communication device 104, a short-range communication link 106 between wireless mobile communication device 104 and in-vehicle system 102, a wireless networking communication link 107 between wireless mobile communication device 104 and a network 108, and a processing device, such as a server 110 connected to network 108.

In-vehicle system 102 and wireless mobile communication device 104 may communicate with each other via a short-range communication link 106, which uses short-range communication technology, such as, for example, Bluetooth® technology or other short-range communication technology, for example, Universal Serial Bus (USB). In-vehicle system 102 and wireless mobile communication device 104 may attempt to connect, or pair, with each other via short-range communication link 106. In-vehicle system 102 may send information to wireless mobile communication device 104 in response to detecting an occurrence of a triggering event. The information may be sent in the form of a prompt, or other message, that may or may not request information from the user of the wireless mobile communication device 104. Wireless mobile communication device 104 may send information to in-vehicle system 102 via short-range communication link 106 in response to a triggering event, a message and/or a prompt received from in-vehicle system 102. Wireless mobile communication device 104 may store information received from in-vehicle system 102, and/or may provide the information to a remote processing device, such as, for example, server 110, via network 108.

In some embodiments, in-vehicle system 102 may provide information to the wireless mobile communication device 104. Wireless mobile communication device 104 may use that information to obtain additional information from network 108 and/or server 110. The additional information may also be obtained in response to providing information with respect to a prompt on wireless mobile communication device 104 from in-vehicle system 102. The additional information may be in the form of a business review, an advertisement and/or an electronic coupon. The electronic coupon may be redeemed, at a later time, for a discount on goods or services and may provide an incentive for a user to provide the requested information.

Network 108 may include a wireless communication network, such as, for example, a cellular telephony network, as well as one or more other networks, such as, the Internet, a public-switched telephone network (PSTN), a packet-switching network, a frame-relay network, a fiber-optic network, and/or other types of networks.

Exemplary Devices

Figure 2:
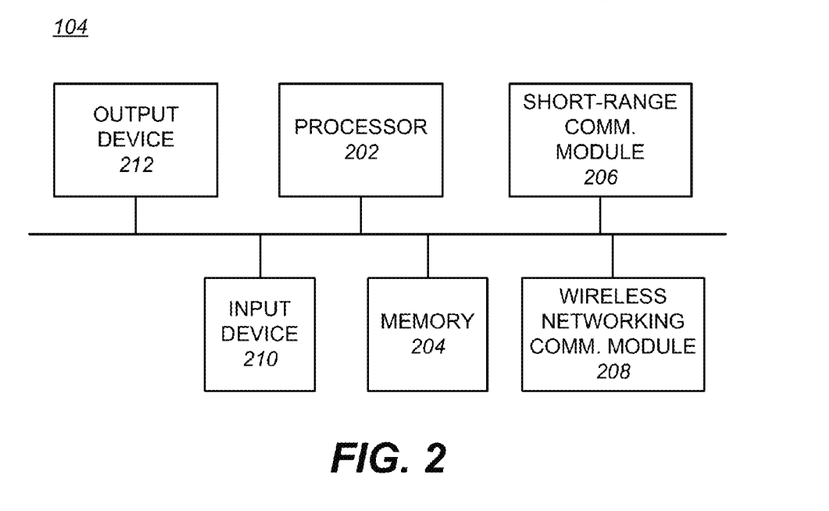
FIG. 2 is a functional block diagram of an exemplary wireless mobile communication device suitable for use in various embodiments.

FIG. 2 is a functional block diagram of an exemplary embodiment of wireless mobile communication device 104. Wireless mobile communication device 104 may include a processor 202, a memory 204, a short-range communication module 206, a wireless networking communication module 208, an input device 210, and an output device 212.

Processor 202 may include one or more conventional processors that interpret and execute instructions stored in a tangible medium, such as memory 204, a media card, flash RAM, or other tangible medium. Memory 204 may include random access memory (RAM) or another type of dynamic storage device, and read-only memory (ROM) or another type of static storage device, for storing this information and instructions for execution by processor 202. RAM, or another type of dynamic storage device, may store instructions as well as temporary variables or other intermediate information used during execution of instructions by processor 202. ROM, or another type of static storage device, may store static information and instructions for processor 202.

Short-range communication module 206 may include a first transceiver for transmitting and receiving information via a wireless short-range communication technology such as, for example, Bluetooth® or other short-range communication technology, for example, Universal Serial Bus (USB). Wireless networking communication module 208 may include a second transceiver for transmitting and receiving information via a wireless communication network, including but not limited to a cellular telephony network.

Input device 210 may include hard keys and/or soft keys, a microphone, a touchscreen, and/or other input device. Output device 212 may include a speaker and/or a display.

Figure 3:
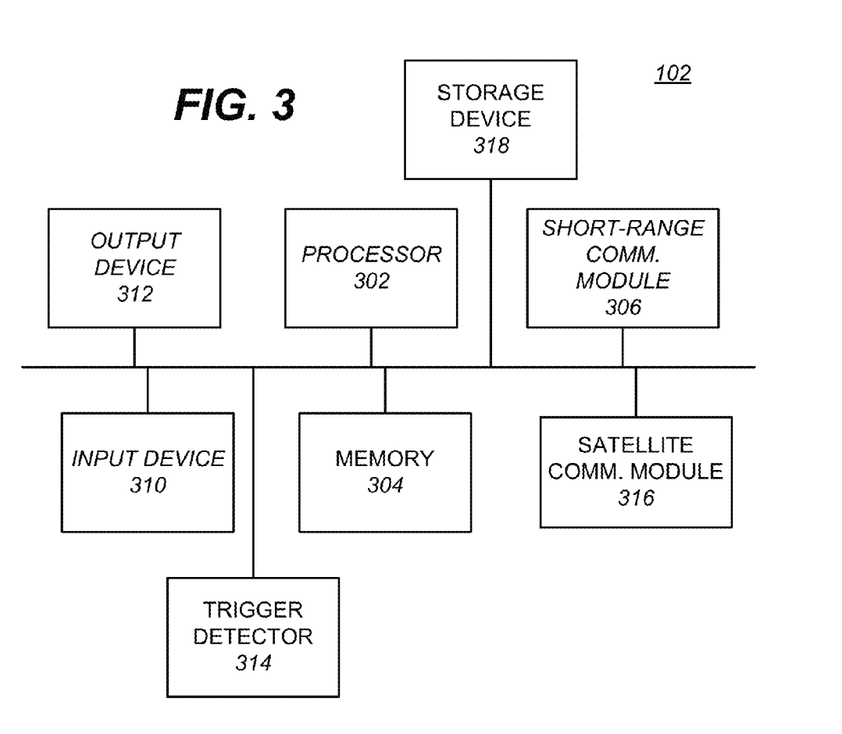
FIG. 3 is a functional block diagram of an exemplary in-vehicle system which may be used in a number of embodiments.

FIG. 3 is a functional block diagram of an exemplary embodiment of in-vehicle system 102. In-vehicle system 102 may include a processor 302, a memory 304, a short-range communication module 306, an input device 310, an output device 312, a trigger detector 314, a satellite communication module 316, and a storage device 318.

Processor 302 may include one or more conventional processors that interpret and execute instructions stored in a tangible medium, such as memory 304, a media card, flash RAM, or other tangible medium. Memory 304 may include random access memory (RAM), or another type of dynamic storage device, and/or read-only memory (ROM), or another type of static storage device, for storing information and instructions for execution by processor 302. RAM, or another type of dynamic storage device, may store instructions as well as temporary variables or other intermediate information used during execution of instructions by processor 302. ROM, or another type of static storage device, may store static information and instructions for processor 302.

Short-range communication module 306 may include a transceiver for transmitting and receiving information via a wireless short-range communication technology such as, for example, Bluetooth® or other short-range communication technology, for example, Universal Serial Bus (USB).

Input device 310 may include hard keys and/or soft keys, a microphone, a touchscreen, and/or other input device. Output device 312 may include a speaker and/or a display.

Trigger detector 314 may detect an occurrence of a triggering event. Trigger detector 314 may be a mechanism that can detect a change of state of a vehicle system or vehicle sensor. Trigger detector 314 can be implemented in hardware, software or a combination thereof. A triggering event can be a single event, a plurality of events or a plurality of events that occur in a particular order. Examples of triggering events may include: vehicle ignition switch on; vehicle ignition switch off; vehicle located at a particular type of location, opening or closing a door, inserting or removing a key from the ignition, as well as other single events, or other events in combination or in a particular order. In various embodiments, actual triggering events may vary from the above-mentioned examples.

In some embodiments, components of in-vehicle system 102 may include a navigation unit for guiding a vehicle, including in-vehicle system 102, to a destination. That is, at least some components of in-vehicle system 102 may function together as a navigation unit. When in-vehicle system 102 includes a navigation unit, in-vehicle system 102 may include a satellite communication module 316 for communicating with global positioning satellites.

Figure 4:
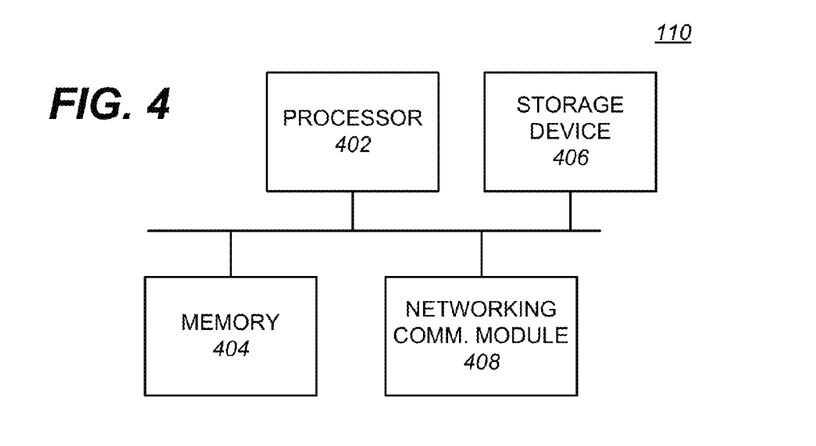
FIG. 4 is a functional block diagram of an exemplary server which may be used with some embodiments.

FIG. 4 is a functional block diagram of an exemplary embodiment of server 110. Server 110 may include a processor 402, a memory 404, a storage device 406, and a networking communication module 408.

Processor 402 may include one or more conventional processors that interpret and execute instructions stored in a tangible medium, such as memory 404, a media card, flash RAM, or other tangible medium. Memory 404 may include random access memory (RAM) or another type of dynamic storage device, and read-only memory (ROM) or another type of static storage device. RAM, or another type of dynamic storage device, may store instructions as well as temporary variables or other intermediate information used during execution of instructions by processor 402. ROM, or another type of static storage device, may store static information and instructions for processor 402.

Networking communication module 408 may include a transceiver for transmitting and receiving information via a wired or wireless communication network, such as network 108 or other network.

Exemplary Process

Figure 5:
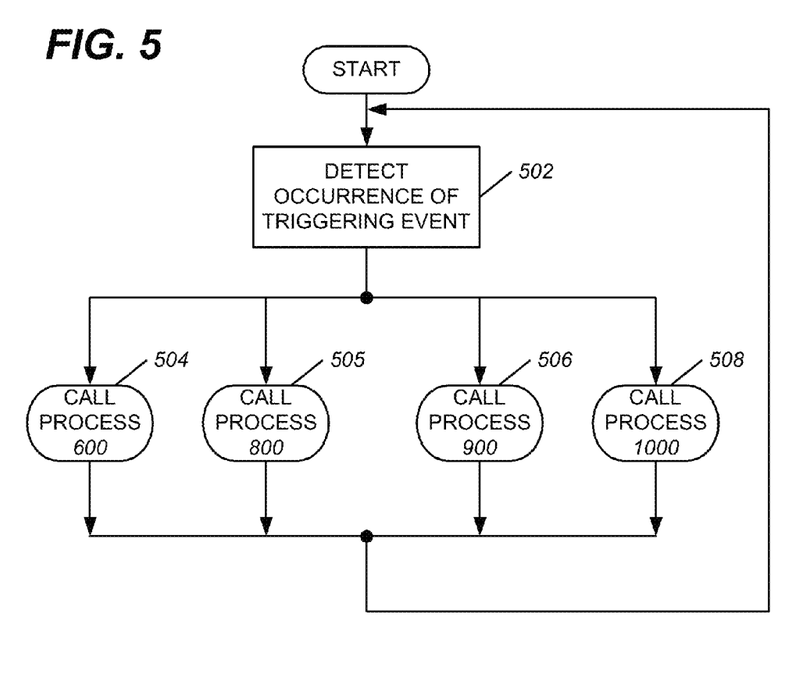
FIGS. 5-10 are flowcharts illustrating exemplary processing which may be performed in various embodiments.

FIG. 5 is a flowchart illustrating exemplary processing in an embodiment. The process may begin with in-vehicle system 102 determining whether a triggering event has occurred (act 502). If no triggering event has occurred, then in-vehicle system 102 may continue to wait for an occurrence of a triggering event.

If a triggering event has occurred, then in-vehicle system 102 may call process 600 (act 504), call process 800 (act 505), call process 900 (act 506), or call process 1000 (act 508), depending upon a type of triggering event detected.

Figure 6:
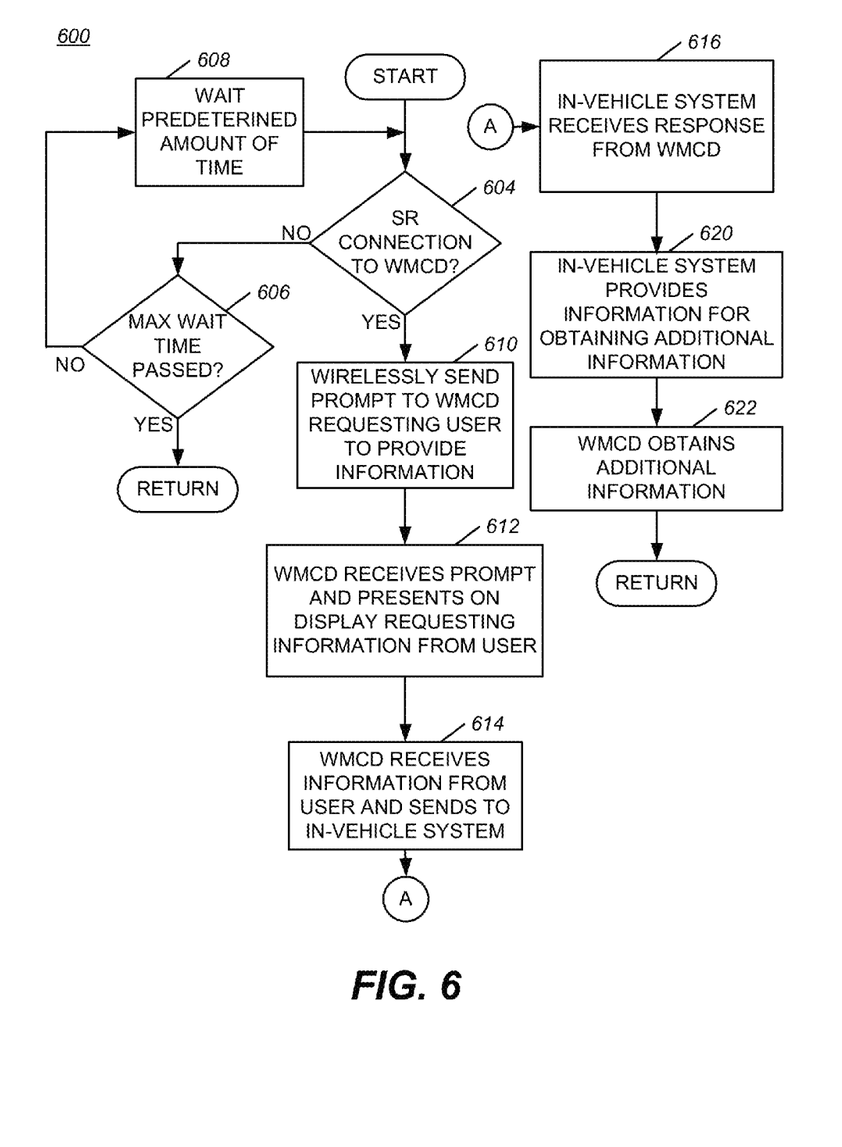

FIG. 6 illustrates exemplary processing with respect to process 600. The process may begin with in-vehicle system 102 determining whether a connection exists with wireless mobile communication device 104 (act 604).

Figure 7:
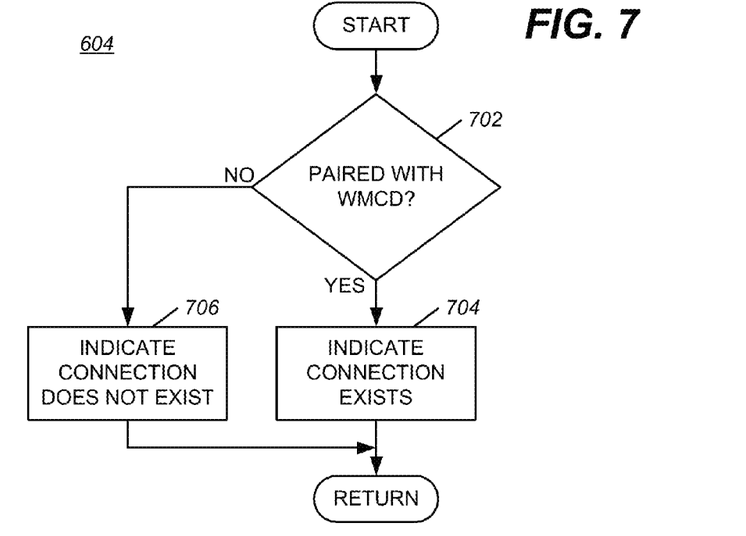

FIG. 7 is a flowchart illustrating act 604. The process may begin with in-vehicle system 102 determining whether a pairing relationship exists between the in-vehicle system 102 and wireless mobile communication device 104 (act 702). The pairing relationship may use Bluetooth® technology in some embodiments. If the pairing relationship is determined to exist, then an indication may be returned indicating that a connection exists (act 704). Otherwise, an indication may be returned indicating that a connection does not exist (act 706).

Returning to FIG. 6, if no connection is determined to exist with wireless mobile communication device 104, then in-vehicle system 102 may determine whether a maximum waiting time has passed (act 606). The maximum waiting time may be 60 seconds or another suitable time period. If the maximum waiting time has passed, then in-vehicle system 102 may wait a pre-determined amount of time, such as, for example, 10 seconds, or another suitable time period before performing act 604 again.

If, during act 606, in-vehicle system 102 determines that the maximum waiting time has passed, then in-vehicle system 102 may simply cause control to be returned to a calling program and processing with respect to the triggering event may be discarded.

If, during act 604, in-vehicle system 102 determines that a connection exists with wireless mobile communications device 104, then in-vehicle system 102 may wirelessly send a prompt, via short-range communication module 306, to wireless communication device 104 requesting information from a user (act 610). Wireless mobile communication device 104 may receive the prompt and may present the prompt on a display of wireless communication device 104 (act 612). In some embodiments, the prompt may be presented in a pop-up style on the display. The displayed prompt may include one or more areas for the user to provide requested information. Wireless mobile communication device 104 may receive the requested information from the user and may send the requested information to in-vehicle system 102 via short-range communication link 106 (act 614).

In-vehicle system 102 may receive the response from wireless mobile communication device 104 via short-range communication link 106 (act 616). Next, in-vehicle system 102 may provide information for obtaining additional information to wireless mobile communication device 104 (act 620). The additional information may be in the form of a business review, an advertisement and/or an electronic coupon. Wireless mobile communication device 104 may then obtain the additional information (act 622). In some embodiments, wireless mobile communication device 104 may obtain the additional information from server 110. In other embodiments, wireless mobile communication device 104 may obtain the additional information from other sources.

Wireless mobile communication device 104 may store the additional information, such that the additional information may not be altered by the user. Eventually, act 502 may again be performed to detect, or wait for, an occurrence of a next triggering event.

Figure 8:
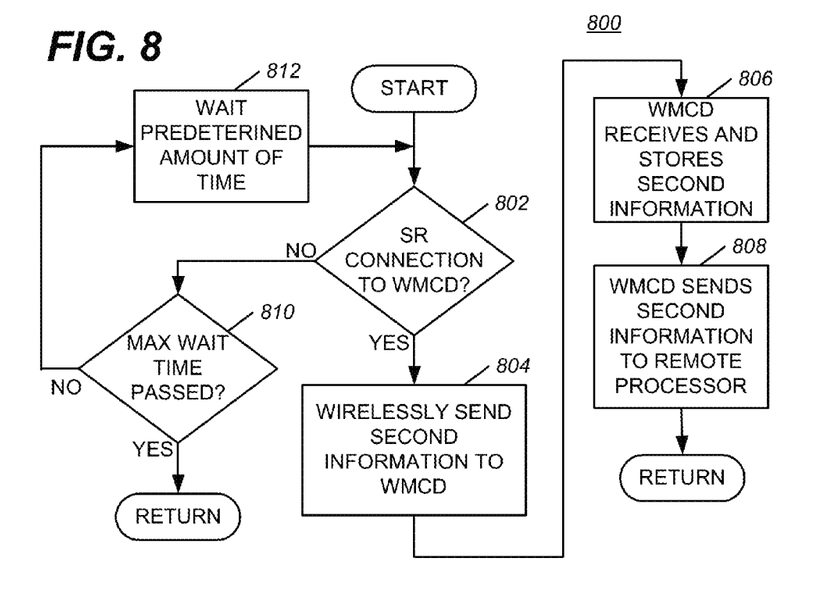

Returning to FIG. 5, if the detected triggering event is of a second type, then in-vehicle system 102 may call process 800. In some embodiments, the second type of triggering event includes a vehicle ignition switch on event.

FIG. 8 is a flowchart illustrating exemplary processing with respect to a detected occurrence of the second type of triggering event. The process may begin with in-vehicle system 102 determining whether a connection exists between in vehicle system 102 and wireless mobile communication device 104 (act 802). In various embodiments, processing with respect to act 802 may be identical to the exemplary processing illustrated in FIG. 7.

If in-vehicle system 102 determines that a connection with a wireless mobile communication device 104 exists, via short-range communication link 106, then in-vehicle system 102 may send second information to wireless mobile communication device 104 via short-range communication link 106 (act 804). In some embodiments, second information may include vehicle status information. Vehicle status information may include a current odometer reading, a trip odometer reading, average miles per gallon, average speed, estimated distance until refueling, estimated oil life, last maintenance date, last maintenance odometer reading, tire pressure, next maintenance odometer reading, dealer information, interior lighting settings, and/or door lock settings, as well as other vehicle status information. The above-listed examples of vehicle status information are only exemplary. In other embodiments, actual vehicle status information may vary from the above.

Wireless mobile communication device 104 may receive the second information and may store the second information (act 806) and/or may send the second information to a remote processor, such as, for example, server 110 or another remote processor (act 808).

If, during act 802, in-vehicle system 102 determines that a short-range connection between in-vehicle system 102 and wireless mobile communication device 104 does not exist, then in-vehicle system 102 may determine whether a maximum amount of time has passed, such as, for example, 60 seconds, or another suitable time period (act 810). If the maximum amount of time has passed, then in-vehicle system 102 may cause control to return to a calling program. Otherwise, in-vehicle system 102 may wait a predetermined amount of time, such as, for example, 10 seconds, or another suitable time period (act 812) before again performing act 802.

Figure 9:
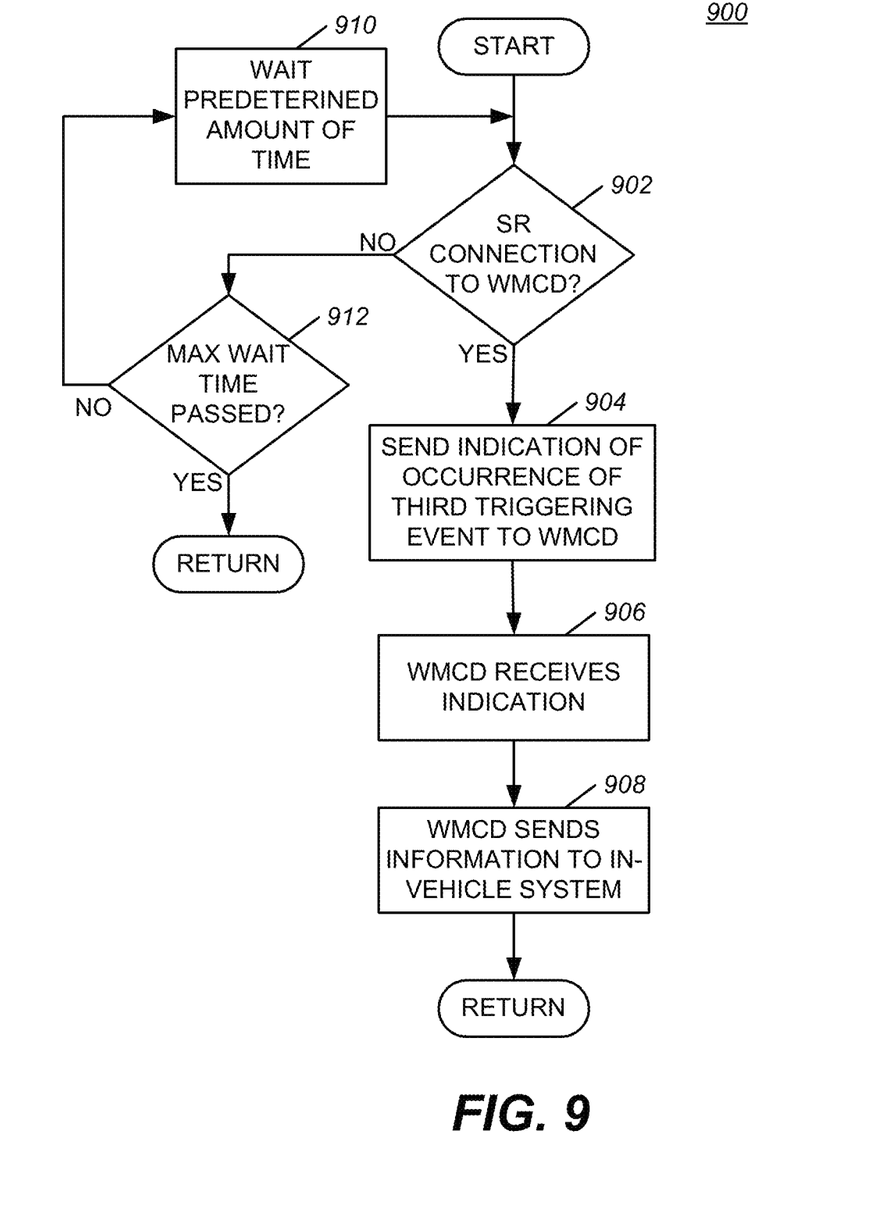

Returning to FIG. 5, when a third type of triggering event is detected, in-vehicle system 102 may call process 900 (act 506).

FIG. 9 illustrates is a flowchart illustrating exemplary processing with respect to a detected occurrence of a third type of triggering event. The process may begin with in-vehicle system 102 determining whether a short-range communication connection exists between in vehicle system 102 and wireless mobile communication device 104 (act 902). In various embodiments, processing with respect to act 902 may be identical to the exemplary processing illustrated in FIG. 7.

If, during act 902, in-vehicle system 102 determines that a short-range communication connection between in-vehicle system 102 and wireless mobile communication device 104 exists, then in-vehicle system 102 may send an indication of an occurrence of a third triggering event to a wireless mobile communication device 104 via the short-range communication connection (act 904). Wireless mobile communication device 104 may receive the indication via the short-range communication connection (act 906) and may send information to in-vehicle system 102 (act 908).

In one embodiment, the third type of triggering event may be a vehicle ignition switch on event and in-vehicle system 102 may inform wireless mobile communication device 104 of an occurrence of the vehicle ignition switch on event. Upon being notified of the occurrence of the vehicle ignition switch on event, wireless mobile communication device 104 may send information to in vehicle system 102, such as, for example, vehicle status information, or another type of information.

Figure 10:
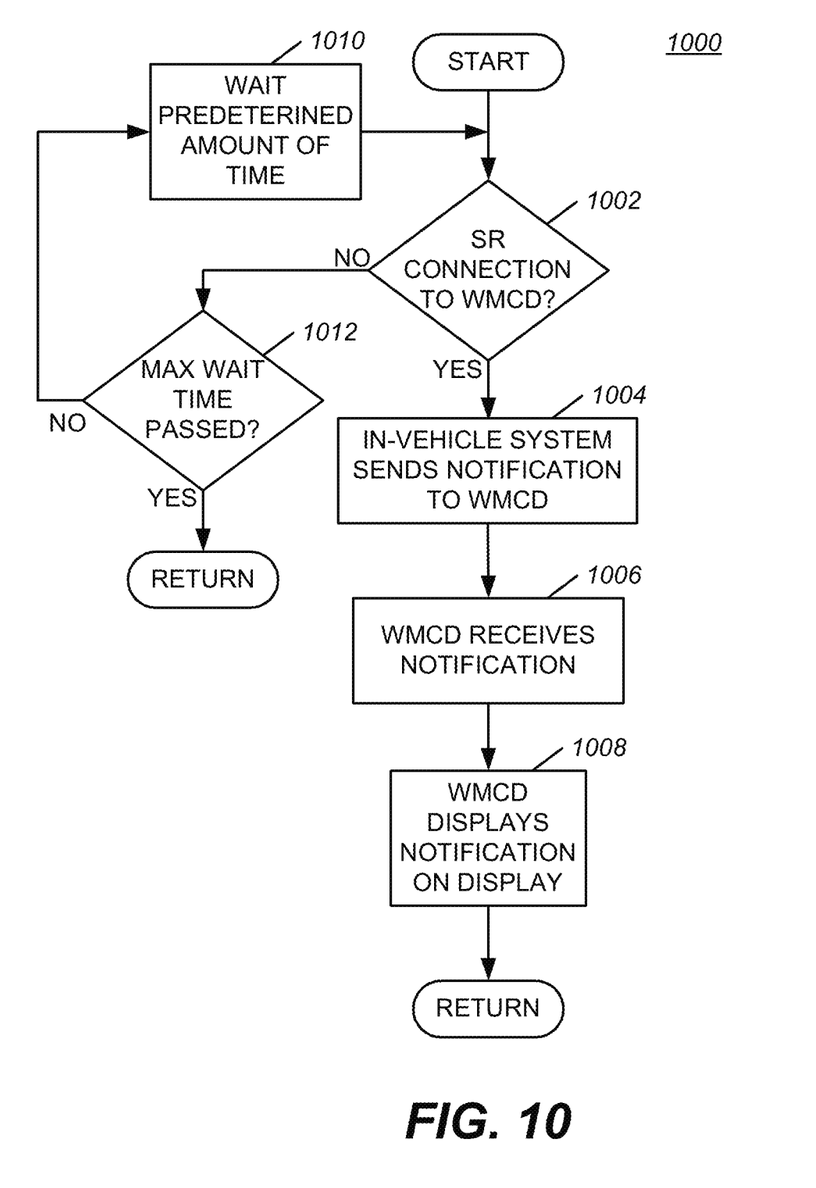

Returning to a FIG. 5, when a fourth type of triggering event is detected, in-vehicle system 102 may call process 1000 (act 508).

FIG. 10 is a flowchart illustrating exemplary processing with respect to a detected occurrence of a fourth type of triggering event. The process may begin with in-vehicle system 102 determining whether a short-range communication connection exists between in-vehicle system 102 and wireless mobile communication device 104 (act 1002). In various embodiments, processing with respect to act 1002 may be identical to the exemplary processing illustrated in FIG. 7.

If, during act 1002, in-vehicle system 102 determines that a short-range communication connection between in-vehicle system 102 and wireless mobile communication device 104 exists, then in-vehicle system 102 may send a notification to wireless mobile communication device 104 (act 1004). The notification may include information such as, "vehicle lights left on", or another notification. Wireless mobile communication device 104 may then display the notification on a display screen.

The above-described processes are only exemplary. For example, the above exemplary processes discuss four types of triggering events. However, in other embodiments, fewer than four types of triggering events, or more than four types of triggering events may be defined.

Further, in an embodiment in which wireless mobile communication device 104 receives and stores an electronic coupon, the electronic coupon may be redeemed in a number of different ways. For example, the electronic coupon may be displayed on the display of wireless mobile communication device 104 and presented to a merchant. The merchant may honor the electronic coupon and may enter a specific code on wireless mobile communication device 104 to either delete the electronic coupon or indicate redemption of the electronic coupon. In another embodiment, the electronic coupon may be sent to a merchant's device, either via infrared light transmissions, via a physical connection with the merchant device, or via another transmission means. Upon completion of sending of electronic coupon to the merchant's device, wireless mobile communication device 104 may delete the electronic coupon.

Destination Information Sharing

In one embodiment, the in-vehicle system 102 includes a navigation system that provides navigation features such as maps, turn-by-turn directions, points-of-interest (POIs), and other conventional navigation features. A problem with conventional navigation systems is that they are only useful up until the point when the user parks and exits the vehicle. However, the user's final destination is often still a substantial distance from the parking spot. A conventional vehicle navigation system cannot provide further assistance to the user in navigating from the parked vehicle to the final destination. Instead, once on foot, the user would have to resort to other techniques, such as, for example, performing a visual search, utilizing an information center or kiosk, viewing printed information or using a separate navigation application executing on a mobile device.

One embodiment of the in-vehicle system 102 solves the problem mentioned above by automatically sharing destination information with the mobile communication device 104. When a user parks the vehicle while navigating to a destination, the vehicle senses a trigger event, such as, for example, vehicle ignition shut off. This event triggers the transfer of destination information from the in-vehicle system 102 to the mobile communication device 104 via the short-range communication link 106. The mobile communication device 104 then provides remaining navigation instructions to guide the user the rest of the way to the destination by foot.

Figure 11:
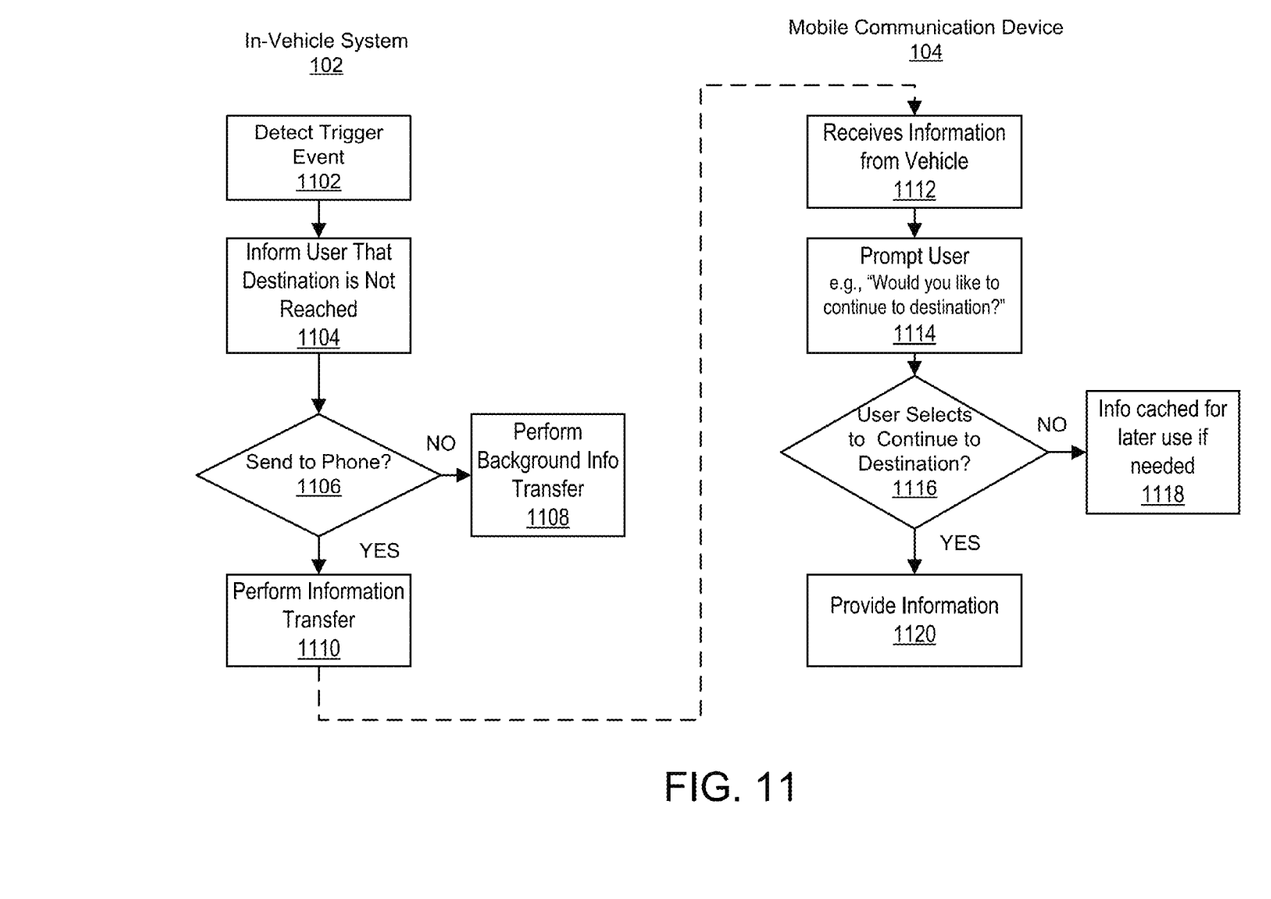
FIG. 11 is a flowchart illustrating an exemplary process for destination sharing, for use in various embodiments.

FIG. 11 is a flowchart illustrating processes performed by the in-vehicle system 102 and the mobile communication device 104 for destination sharing. While navigating to a desired destination, the in-vehicle system 102 detects 1102 a trigger event indicating that the vehicle is parked. For example, the trigger event may comprise turning off the vehicle ignition, closing or locking the driver side door, or a combination of events. Assuming that the current location is still at least a minimum distance from the desired destination, the in-vehicle system 102 alerts 1104 the user that the destination has not yet been reached (e.g., via a visual and/or audible alert). The vehicle system 102 then determines 1106 whether or not to transfer the destination information to the mobile communication device 104. In one embodiment, for example, the in-vehicle system 102 prompts the user on the in-vehicle display as to whether or not the user would like the destination information transferred. In another embodiment, a default setting may be used. For example, in one embodiment, the decision 1106 is omitted and the in-vehicle system always performs 1110 the information transfer. In yet another embodiment, the decision 1106 depends on various factors such as, for example, the distance from where the vehicle is parked to the final destination. Thus, in one embodiment, the in-vehicle system determines a distance between the in-vehicle system and the desired destination, and determines to send the destination data to the mobile communication device 104 if the distance is greater than a lower threshold difference. In another embodiment, the in-vehicle instead determines to send the destination data to the mobile communication device 104 only if the distance is less than a upper threshold difference. In yet another embodiment, both a lower and upper threshold is used, and the information is sent only when the distance falls between the thresholds.

If the in-vehicle system 102 determines 1106 to transfer the destination information to the mobile communication device 104, the destination data is transferred 1110 from the in-vehicle system 102 to the mobile communication device 104. In a first embodiment, the transferred data includes complete navigation and destination information. For example, the destination data may include one or more of graphical map data, POI (Point-of-interest) information for the nearby area, a turn-by-turn direction list to the destination, and both the current vehicle location and the desired destination location. This embodiment is particularly advantageous for use with lower cost mobile communication devices 104 that do not have navigation capabilities. Furthermore, the embodiment is particularly advantageous when the mobile communication device 104 is not connected to a cellular network (e.g., when the mobile communication device 104 is out of range) and is therefore unable to load web-based navigation or mapping information.

In a second embodiment, the vehicle system transfers only partial destination information and relies on the mobile communication device 104 for determining the rest of the data. This embodiment is useful when the mobile communication device 104 is equipped with an internal mapping and navigation system and the in-vehicle system can therefore reduce the amount of data transferred. For example, in one embodiment, the partial destination information may include only the desired destination location, because the mobile communication device 104 can determine the current location, POIs, turn-by-turn directions, etc. using its own internal navigation application. In another embodiment, the partial destination data may include only the current vehicle location, the desired destination location, and any relevant POIs located nearby. Additional information and guidance would be the responsibility of the mobile communication device 104 and its service connection. In one embodiment, the destination information may include a flag that indicates that the mobile device 104 should automatically display the navigation instructions upon receipt of the information. In yet another embodiment, the destination information can be determined based on a user setting in which the user may custom define what elements to include in the destination information transfer. Furthermore, in one embodiment, the information may be dependent on other factors such as, for example, the user's distance to the desired destination.

In another embodiment, the destination information may include other relevant information related to the desired destination or nearby POIs. For example, in one embodiment, the destination information may include coupons usable at the desired location or a nearby POI.

If the in-vehicle system 102 instead determines 1106 not to transfer the destination information to the mobile communication device 104, the in-vehicle system 102 performs 1108 a background information transfer. In one embodiment, the background information includes different information than the full destination data. For example, the background information could comprise only a subset of the transferred elements discussed above. For example, in one embodiment, the background transfer could include just the vehicle location. In another embodiment, the background transfer may transfer the same information as in the destination data transfer, but changes a flag so that the mobile device 104 does not automatically display the navigation instructions. This would allow, for example, the user to later manually launch the application at a later time and still receive navigation instructions. In yet another embodiment, the background information can be determined based on a user setting in which the user may custom define what elements to include in the background transfer or the information may be dependent on other factors such as, for example, the user's distance to the desired location.

The mobile communication device 104 receives 1112 the destination data transferred from the in-vehicle system 102. The mobile communication device 104 prompts 1114 the user as to whether or not the user would like to continue to the destination (e.g., a visual or audible prompt) and receives 1116 the user's decision. If the user selects not to continue the destination, the destination data is cached 1118 and may be used later should the user later decide to utilize it. Thus, for example, if the user later requests the navigation instructions, the mobile communication device retrieves the stored destination data and displays the navigation instructions. If the user selects to continue to the destination, the mobile communication device 104 provides 1120 destination information. In one embodiment, where complete destination data is transferred, the mobile communication device 104 is responsible only for displaying the received information, and optionally, the current location. No external data needs to be pulled from external sources. In another embodiment, where partial destination data is transferred, the mobile communication device 104 opens its navigation or mapping application and inputs the coordinates of the desired destination. The mobile communication device 104 then provides navigation guidance to the destination including, for example, a map, turn-by-turn walking (or public transportation) directions, and points-of-interest in the vicinity. In yet other embodiment, the information may include a menu that allows the user to select options to navigate to the destination or access coupons usable at the desired destination or POIs. In one embodiment, destination information such as navigation instructions, coupons, or other information may be automatically displayed only when the user gets within a certain distance of the desired destination.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not to be construed as limiting the claims in any way. Other configurations of the described embodiments are part of the scope of this disclosure. In addition, acts illustrated by the flowcharts of FIGS. 5-10 may be performed in a different order in other embodiments, and may include additional or fewer acts. For example, in some embodiments, instead of detecting a triggering event and then determining that a short-range communication connection with a wireless mobile communication device exists before communicating with the wireless mobile communication device, an in-vehicle system, instead, may detect an occurrence of a triggering event only when the short-range connection is determined to exist. Further, in other embodiments, other devices or components may perform portions of the acts described above. Accordingly, the appended claims and their legal equivalents define the invention, rather than any specific examples given.

The invention claimed is:

1. A method implemented on a mobile communication device for handling destination data, the method comprising:
    receiving, by the mobile communication device from an in-vehicle system via a short-range communication connection, destination data corresponding to a desired destination;
    displaying, by the mobile communication device, a prompt requesting a user to select whether or not to continue to the desired destination;
    receiving, by the mobile communication device, a user response to the prompt;
    responsive to the user response indicating that the user selected not to continue to the desired destination, storing the destination data to the mobile communication device; and
    responsive to the user response indicating that the user selected to continue to the desired destination, providing navigation instructions to the desired destination based on the destination data.

2. The method of claim 1, wherein the destination data includes directions from a vehicle location to the desired destination, the method further comprising:
    displaying the directions on the mobile communication device.

3. The method of claim 2, wherein the destination data further comprises one or more of:
    a graphical map data, a point of interest in proximity to a current location, the vehicle location, and the desired destination location.

4. The method of claim 2, where the mobile communication device lacks a connection to a cellular network.

5. The method of claim 1, wherein the destination data includes the desired destination, the method further comprising:
    loading a navigation application on the mobile communication device;
    automatically entering the desired destination to the navigation application; and
    generating navigation directions from a current location to the desired destination using the navigation application.

6. The method of claim 1, wherein the user response to the prompt indicates that the user does not want to continue to the desired destination, the method further comprising:
    responsive to later receiving a request for the navigation instructions, retrieving the stored destination data and displaying the navigation instructions.

7. The method of claim 1, further comprising:
    displaying a coupon associated with the desired destination.

8. A method implemented on an in-vehicle computing system for sharing destination data, the method comprising:
    detecting, by the in-vehicle computing system, an occurrence of a trigger event while the in-vehicle system is providing navigation guidance to a desired destination;
    responsive to detecting the occurrence of the trigger event, determining whether to send the destination data to a mobile communication device;
    responsive to determining not to send the destination information to the mobile communication device, performing a background information transfer from the in-vehicle system to the vehicle; and
    responsive to determining to send the destination data to the mobile communication device, performing an information transfer of the destination data to the mobile communication device.

9. The method of claim 8, wherein determining whether to send the destination data to the mobile communication device comprises:
    prompting a user as to whether or not to send the destination data to the mobile communication device; and
    receiving a response to the prompt.

10. The method of claim 8, wherein determining whether to send the destination data to the mobile communication device comprises:
    determining a distance between the in-vehicle system and the desired destination;
    and determining to send the destination data to the mobile communication device if the distance is greater than a lower threshold difference.

11. The method of claim 8, wherein determining whether to send the destination data to the mobile communication device comprises:
    determining a distance between the in-vehicle system and the desired destination;
    and determining to send the destination data to the mobile communication device if the distance is less than an upper threshold difference.

12. The method of claim 8, wherein the destination data comprise one or more of: a graphical map data, a point of interest in proximity to a current location, the vehicle location, the desired destination location, and turn-by-turn directions to the desired destination.

13. The method of claim 8, wherein the background information transfer comprises transmitting only a subset of the destination data.

14. The method of claim 8, wherein the destination data comprises a coupon associated with the desired destination.

15. An in-vehicle system for use in a vehicle, the in-vehicle system comprising:
    a navigation unit for generating directions to a desired destination;
    a short-range communication device for communicating with a mobile communication device via short-range communication protocol;
    at least one processor; and
    a non-transitory computer readable storage medium storing computer-executable program instructions for sharing destination data, the instructions when executed cause the at least one processor to perform steps including:
    detecting an occurrence of a trigger event while the navigation unit is providing navigation guidance to a desired destination;
    responsive to detecting the occurrence of the trigger event, determining whether to send the destination data to a mobile communication device;
    responsive to determining not to send the destination information to the mobile communication device, performing a background information transfer from the in-vehicle system to the vehicle; and
    responsive to determining to send the destination data to the mobile communication device, performing an information transfer of the destination data to the mobile communication device.

16. The in-vehicle system of claim 15, wherein determining whether to send the destination data to the mobile communication device comprises:
prompting a user as to whether or not to send the destination data to the mobile communication device; and
receiving a response to the prompt.

17. The in-vehicle system of claim 15, wherein determining whether to send the destination data to the mobile communication device comprises:
determining a distance between the in-vehicle system and the desired destination;
and determining to send the destination data to the mobile communication device if the distance is greater than a lower threshold difference.

18. The in-vehicle system of claim 15, wherein determining whether to send the destination data to the mobile communication device comprises:
determining a distance between the in-vehicle system and the desired destination;
and determining to send the destination data to the mobile communication device if the distance is less than an upper threshold difference.

19. The in-vehicle system of claim 15, wherein the background information transfer comprises transmitting only a subset of the destination data.

20. The in-vehicle system of claim 15, wherein the destination data comprises a coupon associated with the desired destination.

21. The in-vehicle system of claim 15, wherein the destination data comprise one or more of: a graphical map data, a point of interest in proximity to a current location, the vehicle location, the desired destination location, and turn-by-turn directions to the desired destination.

22. A non-transitory computer-readable storage medium storing computer-executable program instructions for handling destination data, the instructions when executed cause at least one processor to perform steps including:
receiving from an in-vehicle system via a short-range communication connection, destination data corresponding to a desired destination;
displaying a prompt requesting a user to select whether or not to continue to the desired destination;
receiving a user response to the prompt;
responsive to the user response indicating that the user selected not to continue to the desired destination, storing the destination data to a mobile communication device; and
responsive to the user response indicating that the user selected to continue to the desired destination, providing navigation instructions to the desired destination based on the destination data.

23. The non-transitory computer-readable storage medium of claim 22, wherein the destination data includes directions from a vehicle location to the desired destination, the method further comprising:
displaying the directions on the mobile communication device.

24. The non-transitory computer-readable storage medium of claim 23, wherein the destination data further comprises one or more of: a graphical map data, a point of interest in proximity to a current location, the vehicle location, and the desired destination location.

25. The non-transitory computer-readable storage medium of claim 23, where the mobile communication device lacks a connection to a cellular network.

26. The non-transitory computer-readable storage medium of claim 22, wherein the destination data includes the desired destination, wherein the program instructions when executed further cause the at least one processor to perform steps including:
loading a navigation application on the mobile communication device;
automatically entering the desired destination to the navigation application; and
generating navigation direction from a current location to the desired destination using the navigation application.

27. The non-transitory computer-readable storage medium of claim 22, wherein the user response to the prompt indicates that the user does not want to continue to the desired destination, the method further comprising:
responsive to later receiving a request for the navigation instructions, retrieving the stored destination data and displaying the navigation instructions.

28. The non-transitory computer-readable storage medium of claim 22, wherein the instructions when executed further cause the at least one processor to display a coupon associated with the desired destination.

* * * * *